(12) United States Patent
Yamatari et al.

(10) Patent No.: US 7,379,087 B2
(45) Date of Patent: May 27, 2008

(54) CHAT MANAGEMENT SYSTEM

(75) Inventors: Mitsuyoshi Yamatari, Tokyo (JP); Kouichi Yamada, Tokyo (JP); Kazushi Oota, Tokyo (JP); Gentaro Washio, Tokyo (JP); Kouichi Itou, Tokyo (JP); Takahiro Tsunoji, Tokyo (JP); Kazuhiro Mori, Tokyo (JP); Issei Nishimura, Tokyo (JP); Mitsuru Kodama, Tokyo (JP)

(73) Assignees: Mitsubishi Denki Kabushiki Kaisha, Tokyo (JP); NTT Docomo, Tokyo (JP)

( * ) Notice: Subject to any disclaimer, the term of this patent is extended or adjusted under 35 U.S.C. 154(b) by 1310 days.

(21) Appl. No.: 10/322,421

(22) Filed: Dec. 19, 2002

(65) Prior Publication Data
US 2003/0125995 A1 Jul. 3, 2003

(30) Foreign Application Priority Data
Dec. 27, 2001 (JP) .............................. 2001-397826

(51) Int. Cl.
*H04N 7/15* (2006.01)
(52) U.S. Cl. ................................. 348/14.09; 348/14.08
(58) Field of Classification Search ............ 348/14.09, 348/14.08; 370/260, 261
See application file for complete search history.

(56) References Cited

U.S. PATENT DOCUMENTS

| 5,432,387 | A | | 7/1995 | Kogure et al. |
| 5,491,797 | A | | 2/1996 | Thompson et al. |
| 5,541,639 | A | | 7/1996 | Takatsuki et al. |
| 5,680,392 | A | * | 10/1997 | Semaan ..................... 370/261 |
| 6,195,117 | B1 | * | 2/2001 | Miyazaki ................. 348/14.09 |
| 6,466,252 | B1 | * | 10/2002 | Miyazaki ................... 370/260 |
| 7,213,050 | B1 | * | 5/2007 | Shaffer et al. ............. 709/204 |

FOREIGN PATENT DOCUMENTS

| JP | 5-233103 | 9/1993 |
| JP | 2000-299739 | 10/2000 |

* cited by examiner

*Primary Examiner*—Stella Woo
(74) *Attorney, Agent, or Firm*—Leydig, Voit & Mayer, Ltd.

(57) ABSTRACT

When, for example, an acceptance processing unit, among several acceptance processing units, performs acceptance processing of a reservation request, whether or not there is availability in resources of a video chat device assigned to the acceptance processing unit is checked, and if there is availability in the resource, the use of the resource is reserved.

8 Claims, 10 Drawing Sheets

| <SERVICE ID> | <SERVICE NAME> | <RESOURCE ID> | <RESOURCE NAME> | <NUMBER OF RESOURCES> | <ATTRIBUTE> |
|---|---|---|---|---|---|
| 1 | RESERVATION SERVICE | 1 | VOICE SYNTHESIS | 1-50 | 0 |
| 1 | RESERVATION SERVICE | 2 | PHONE NUMBER | 1-50 | 123-456-789 |
| 1 | RESERVATION SERVICE | 3 | CONFERENCE ROOM | 1-20 | |
| 2 | IMMEDIATE SERVICE | 1 | VOICE SYNTHESIS | 51-80 | |
| ⋮ | | | | | |

FIG.7

| <CHAT ID> | <START TIME> | <CHAT TIME> | <MEMBER PHONE NUMBER> | <CHAT RESOURCE NUMBER> | ... | <CHAT RESOURCE NUMBER> | <CLASSIFICATION OF CONNECTION> |
|---|---|---|---|---|---|---|---|
| 1 | 2001/01/01/12:00:00 | 30 | 0901111111 | 1 | | 1 | DIAL-IN |
| 1 | 2001/01/01/12:00:00 | 30 | 0901111112 | 2 | | 1 | DIAL-IN |
| 2 | 2001/01/01/12:10:00 | 30 | 0901111115 | 3 | | 2 | DIAL-IN |

FIG.9

| <CORPORATION ID> | <CORPORATION NAME> | <CHAT RESOURCE 1> | ... | <CHAT RESOURCE n> |
|---|---|---|---|---|
| 1 | CORPORATION A | 1-50 | | 1-30 |
| 2 | CORPORATION B | 51-20 | | 31-60 |

CHAT MANAGEMENT SYSTEM

BACKGROUND OF THE INVENTION

1. Field of the Invention

The present invention relates to a chat management system which provides a video chat service.

2. Description of Related Art

Figure 12:
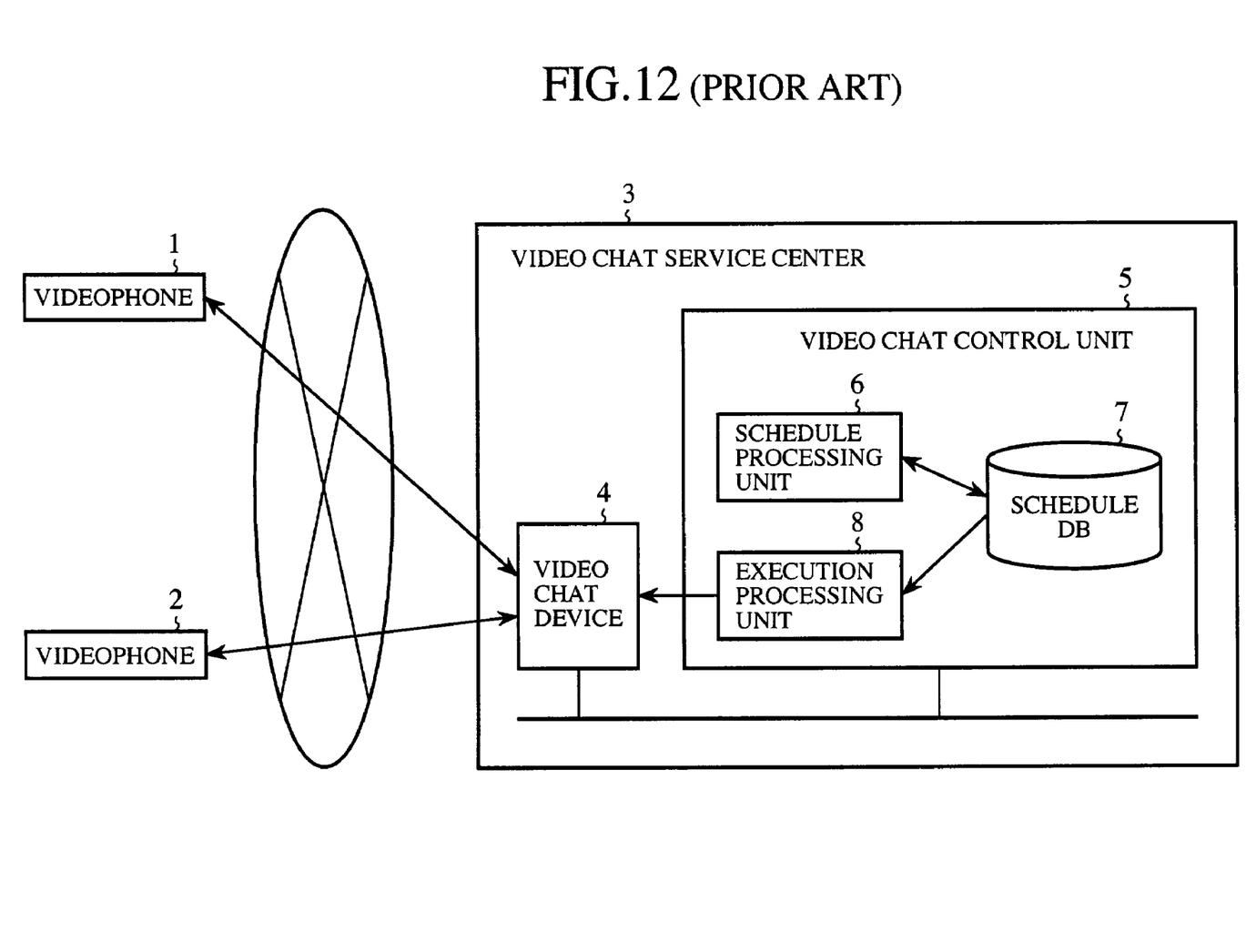
FIG. 12 is a configuration diagram illustrating a conventional chat management system.

FIG. 12 is a configuration diagram illustrating a conventional chat management system, which is shown in JP-A No. 5-233103. In the figure, reference numerals 1, 2 are videophones used for having a video chat with the videophones 2, 1 via a video chat service center 3; reference numeral 3 is the video chat service center that provides video chat service; reference numeral 4 is a video chat device that enables a video chat between videophones 1, 2; reference numeral 5 is a video chat control unit that manages a schedule of the video chat device 4 to control execution of the video chat device 4; reference numeral 6 is a schedule processing unit by which, when an operator of the video chat service center 3 inputs schedule information, the schedule information is stored in a schedule DB or database 7; reference numeral 7 is the schedule DB that stores schedule information; and reference numeral 8 is an execution processing unit for controlling execution of the video chat device 4 according to the schedule information stored in the schedule DB 7.

Next, the operation will be described.

In response to a request from a user of the videophones 1, 2, when an operator of the video chat service center 3 inputs schedule information in which a utilization time of video chat, and the like, are shown, the schedule processing unit 6 of the video chat control unit 5 stores the schedule information in the schedule DB 7.

The execution processing unit 8 of the video chat control unit 5 retrieves the schedule information stored in the schedule DB 7, and then controls the execution of the video chat device 4 according to the schedule information. More specifically, when the utilization time of video chat comes, the execution processing unit 8 starts the execution of the video chat device 4.

As a result, the video chat device 4 originates a call to the videophones 1, 2, or accepts an incoming call from the videophones 1, 2. When a connection to the videophones 1, 2 is made, the video chat device 4 synthesizes voice and video image, which are transmitted from the videophones 1, 2, and then transmits the synthesized voice and the synthesized video image to the videophones 1, 2.

The conventional chat management system is devised as described above. Thus, the conventional chat management system does not have an interface by which a user of the videophones 1, 2 directly operates so that reservations for a video chat are accepted. This produces a problem such that utilization ratio of the video chat device 4 cannot be increased.

SUMMARY OF THE INVENTION

The present invention is devised to solve the problems described above, and aims to provide a chat management system that can increase a utilization ratio of a video chat device by preparing an interface that accepts user's operation for a reservation.

The chat management system according to the present invention is constructed such that it includes: a plurality of accepting means for, when receiving a reservation request for a video chat from a user terminal, performing acceptance processing of the reservation request; a reservation means for, when one of the plurality of accepting means performs acceptance processing of the reservation request, if there is vacancy in the resource of a video chat device which is assigned to the accepting means, making a reservation for the use of the resource; and a control means for controlling execution of the video chat device according to details of the reservation made by the reservation means.

Therefore, according to the present invention, a user can perform a reservation operation directly, which produces an effect of increasing a utilization ratio of the video chat device.

The chat management system according to the present invention may also have a configuration in which the accepting means is placed in a site different from a site to which the reservation means belongs.

The configuration of the chat management system in this manner produces an effect of increasing a utilization ratio of the video chat device furthermore.

DETAILED DESCRIPTION OF THE PREFERRED EMBODIMENTS

Preferred embodiments of the present invention will be described below.

First Embodiment

Figure 1:
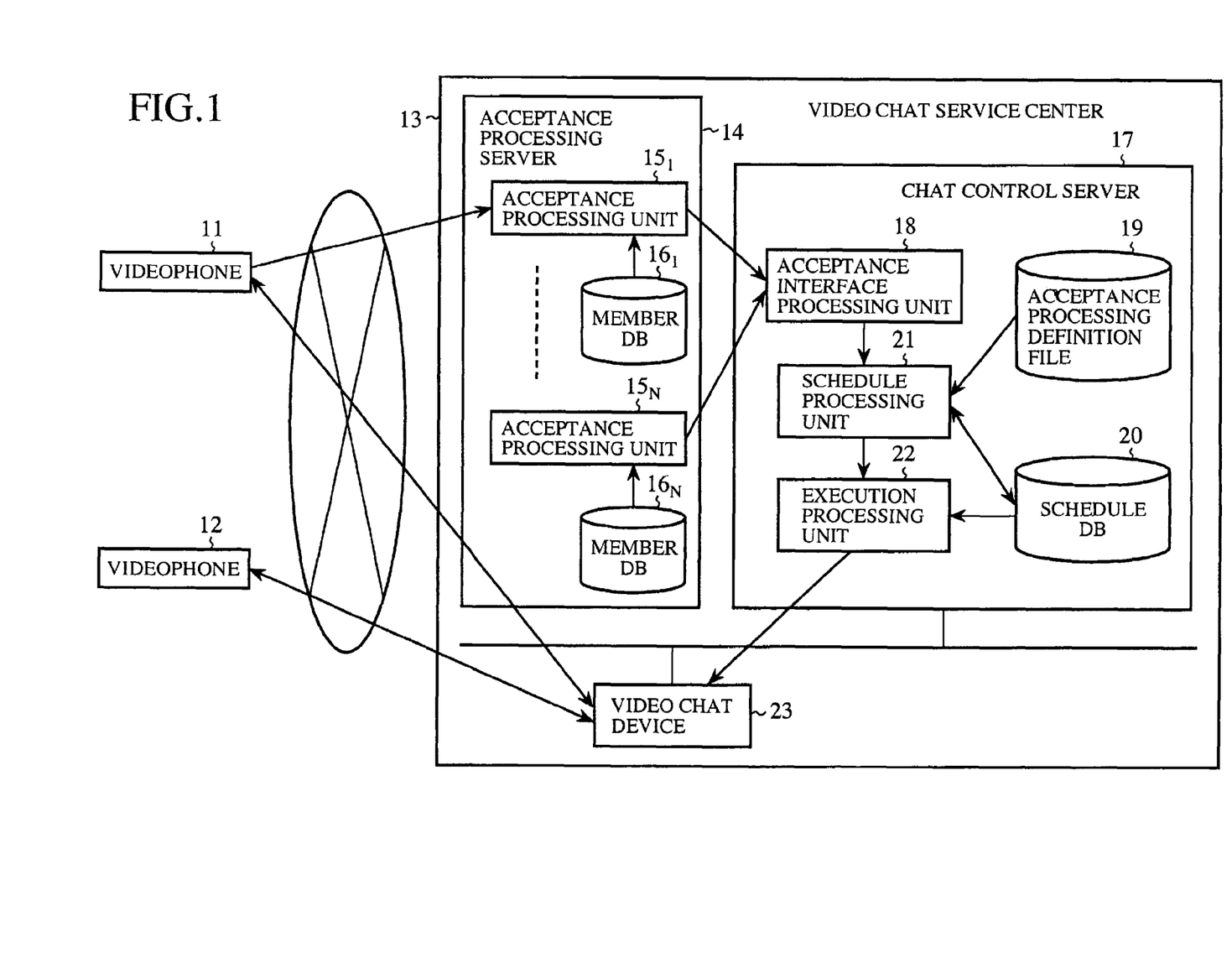
FIG. 1 is a configuration diagram illustrating a chat management system according to a first embodiment of the present invention.

FIG. 1 is a configuration diagram illustrating a chat management system according to a first embodiment of the present invention. In the figure, reference numerals 11, 12 are videophones (user terminals) that are used for having a video chat with the other videophones 12, 11 via a video chat service center 13; and reference numeral 13 is the video chat service center that provides video chat service.

Reference numeral 14 is an acceptance processing server; $15_1$ to $15_N$ are acceptance processing units (accepting means) by which, for example, when receiving a reservation request of video chat from the videophone 11, acceptance processing of the reservation request is performed; and $16_1$ to $16_N$ are member DBs that store member information of the video chat service.

Reference numeral 17 is a chat control server; reference numeral 18 is an acceptance IF (or interface) processing unit by which when one of the acceptance processing units $15_1$ to $15_N$ performs acceptance processing of a reservation request, its request content (for example, a reservation time of chat, the number of videophones used for chat, etc.), and an acceptance ID for identifying the acceptance processing unit which has performed the acceptance processing, are output to a schedule processing unit 21; 19 is an acceptance processing definition file that defines the resources of a video chat device 23 which are assigned to the acceptance processing units $15_1$ to $15_N$, and the like; 20 is a schedule DB for saving schedule information of the resource of the video chat device 23; and 21 is the schedule processing unit by which after referring to the acceptance processing definition file 19 and the schedule DB 20 to check resource availability of the video chat device 23 which is assigned to the acceptance processing unit that has performed acceptance processing, if resources are available, use of the resources is reserved. It is to be noted that the acceptance IF processing unit 18, the acceptance processing definition file 19, the schedule DB 20, and the schedule processing unit 21 constitute a reservation means.

Reference numeral 22 is an execution processing unit (control means) that controls the execution of the video chat device 23 according to the schedule information stored in the schedule DB 20; and 23 is a video chat device that realizes a video chat between the videophones 11, 12.

Figure 2:
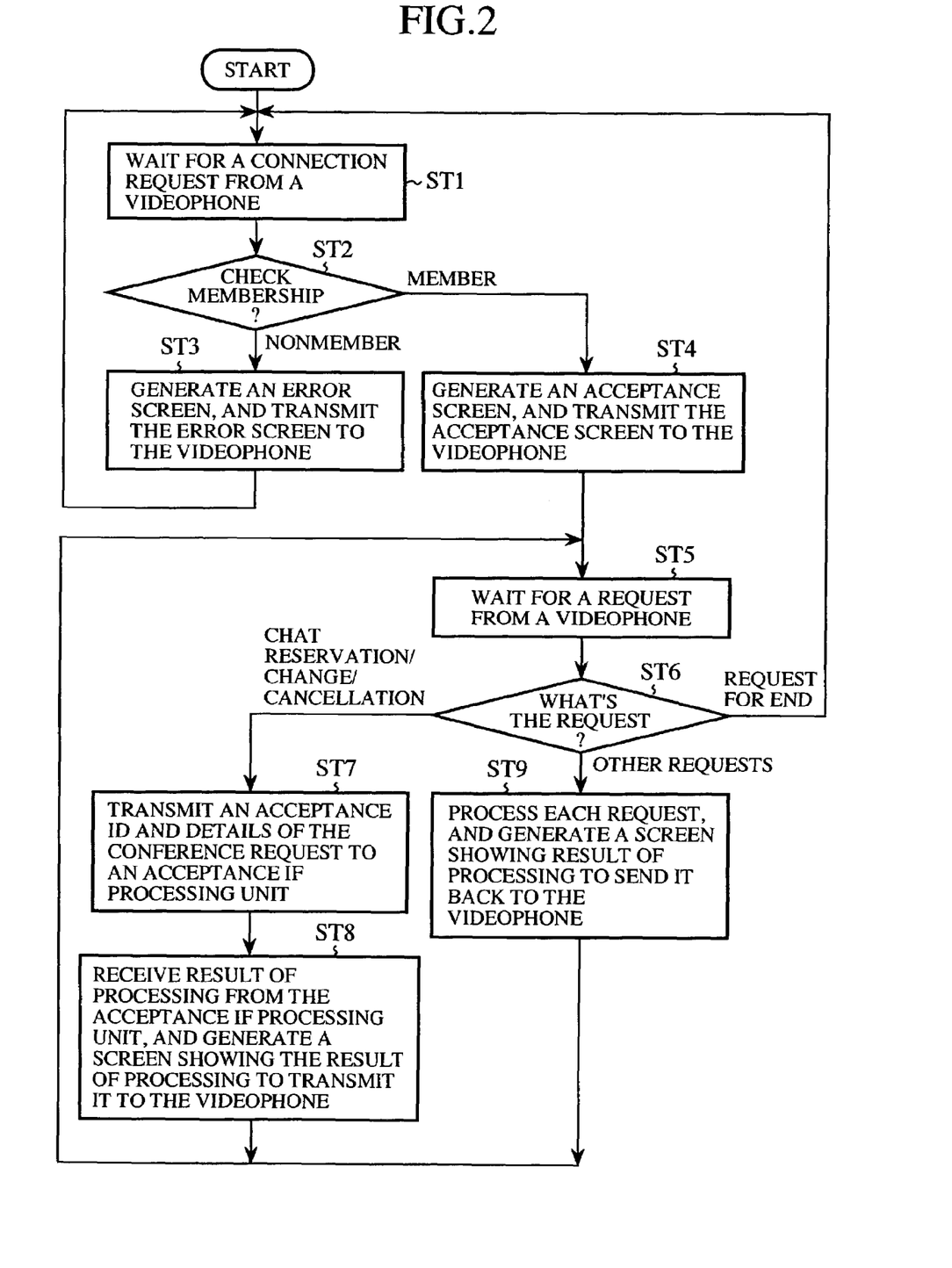
FIG. 2 is a flowchart illustrating the processing performed in an acceptance processing unit.
Figure 3:
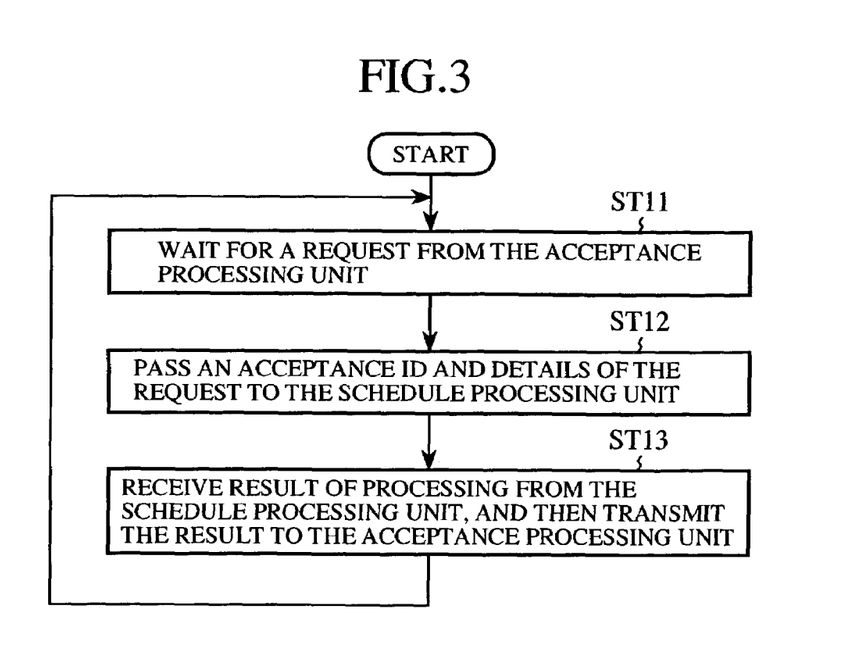
FIG. 3 is a flowchart illustrating the processing performed in an acceptance IF processing unit.
Figure 4:
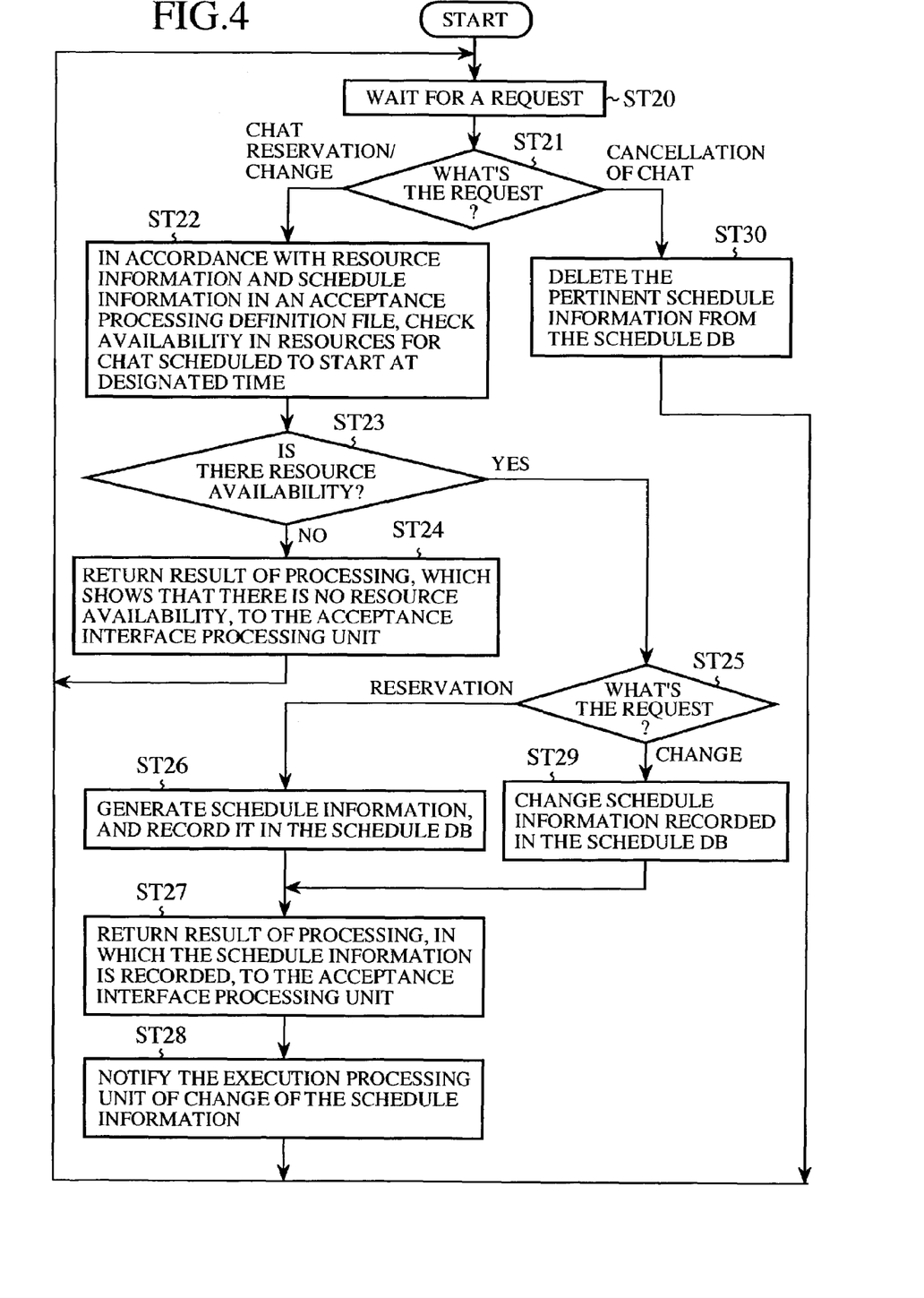
FIG. 4 is a flowchart illustrating the processing performed in a schedule processing unit.
Figure 5:
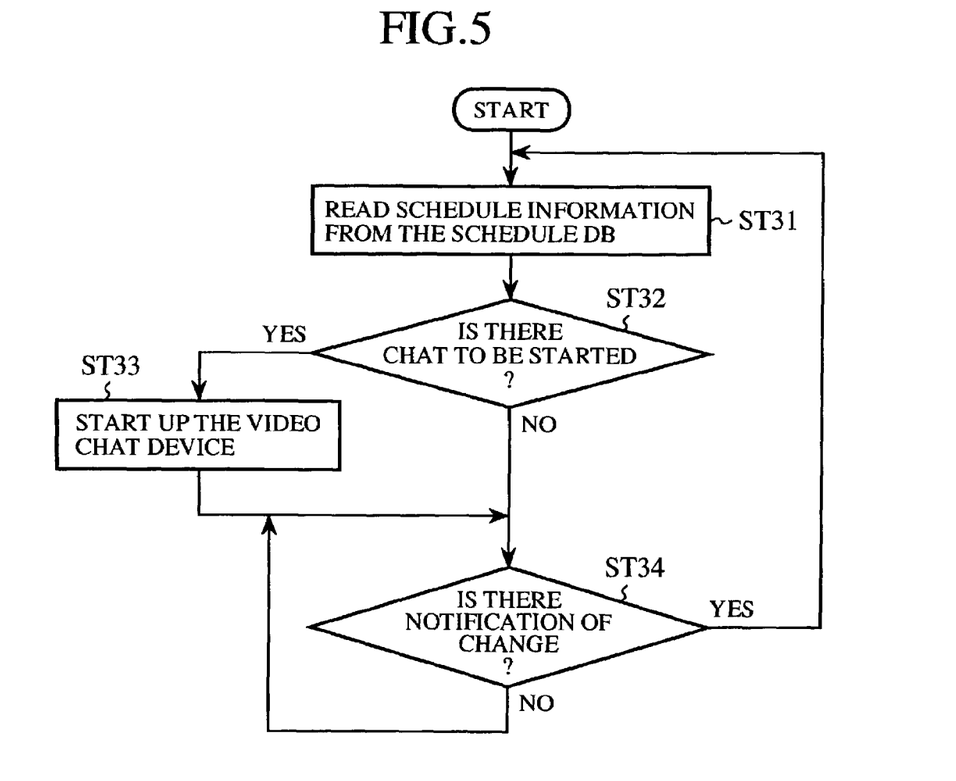
FIG. 5 is a flowchart illustrating the processing performed in an execution processing unit.

FIG. 2 is a flowchart illustrating the processing performed in the acceptance processing unit 15. FIG. 3 is a flowchart illustrating the processing performed in the acceptance IF processing unit 18. FIG. 4 is a flowchart illustrating the processing performed in the schedule processing unit 21. FIG. 5 is a flowchart illustrating the processing performed in the execution processing unit 22.

Next, the operation will be described.

For example, when a user of the videophone 11 performs a given operation for the videophone 11 to have a video chat with a user of the videophone 12, the videophone 11 outputs a connection request to the acceptance processing server 14, and also outputs the terminal information of the videophone 11 or member information of the user to the acceptance processing server 14. However, in this case, for convenience of explanation, it is assumed that the connection request, and the like, are output to the acceptance processing unit $15_1$ of the acceptance processing server 14.

The acceptance processing unit $15_1$ of the acceptance. processing server 14 receives the connection request and the terminal information of the videophone 11 or the member information of the user from the videophone 11 (step ST1), and then compares the terminal information or the member information with the information stored in the member DB $16_1$ to judge whether or not the user of the videophone 11 is a member of the video chat service (step ST2).

If the user of the videophone 11 is not a member of the video chat service, the acceptance processing unit $15_1$ of the acceptance processing server 14 generates an error screen showing that the video chat service cannot be accepted, and then transmits the error screen to the videophone 11 (step ST3).

On the other hand, if the user of the videophone 11 is a member of the video chat service, the acceptance-processing unit $15_1$ generates an acceptance screen for accepting the service reservation, and then transmits the acceptance screen to the videophone 11 (step ST4).

When the videophone 11 receives and displays the acceptance screen, the user of the videophone 11 operates the videophone 11 to input the details of a request (for example, a reservation time of chat, the number of videophones used for a chat, etc.) in input columns of the request details on the acceptance screen.

After the user input is completed, the videophone 11 transmits the request details to the acceptance-processing unit $15_1$.

When the acceptance processing unit $15_1$ of the acceptance processing server 14 receives the request details from the videophone 11 (step ST5), if the request details relate to reservations for a chat, a change of chat, etc., the acceptance processing unit $15_1$ outputs the request details and its acceptance ID (a unique ID number assigned to the acceptance processing unit $15_1$) to the acceptance IF processing unit 18 (step ST7). On the other hand, if the request details are not related to reservations for a chat, a change of chat, etc., the acceptance processing unit $15_1$ executes given processing according to the request details, and then generates a screen showing the result of the processing, which is sent back to the videophone 11 (step ST9).

When the acceptance IF processing unit 18 of the chat control server 17 receives the request details and the acceptance ID from the acceptance processing unit $15_1$ (step ST11), the acceptance IF processing unit 18 outputs the request details and the acceptance ID to the schedule processing unit 21 (step ST12).

When the schedule processing unit 21 of the chat control server 17 receives the request details and the acceptance ID from the acceptance IF processing unit 18 (step ST20), the schedule processing unit 21 determines as to what the processing requested by the request details is: that is to say, reservations for a chat, a change of chat, or a cancellation of chat (step ST21).

Figure 6:
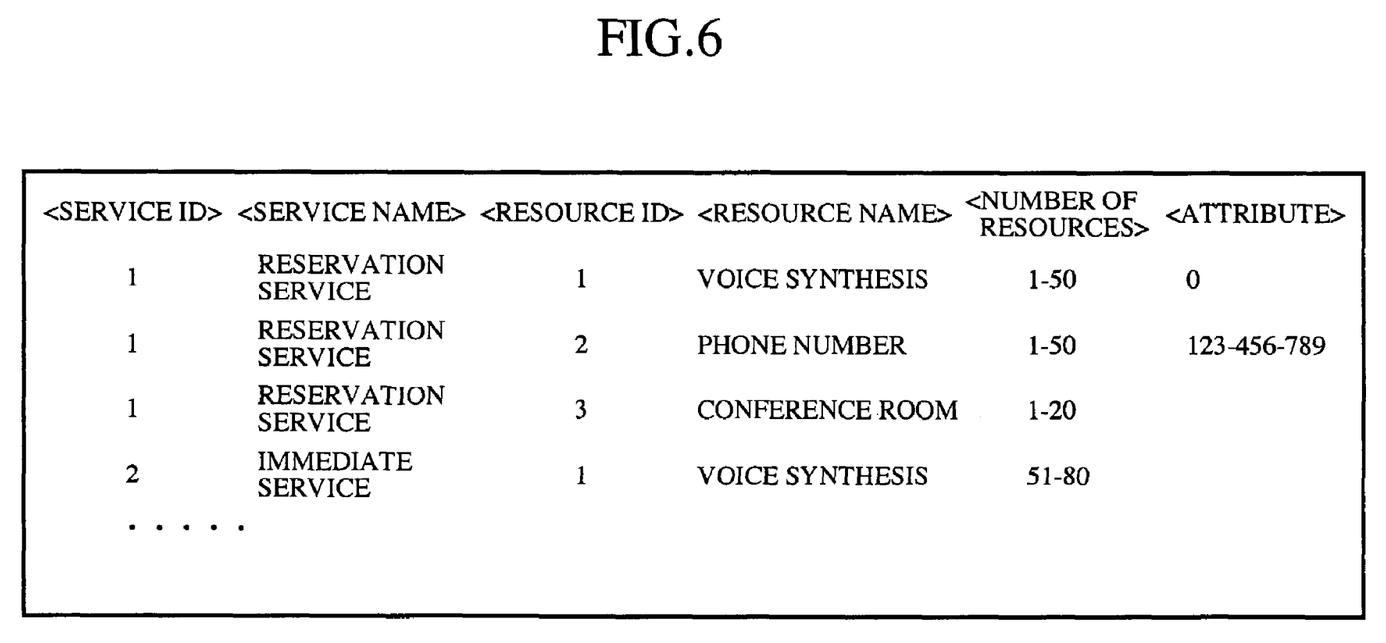
FIG. 6 is an explanatory diagram illustrating the details of definition of an acceptance processing definition file.
Figure 7:
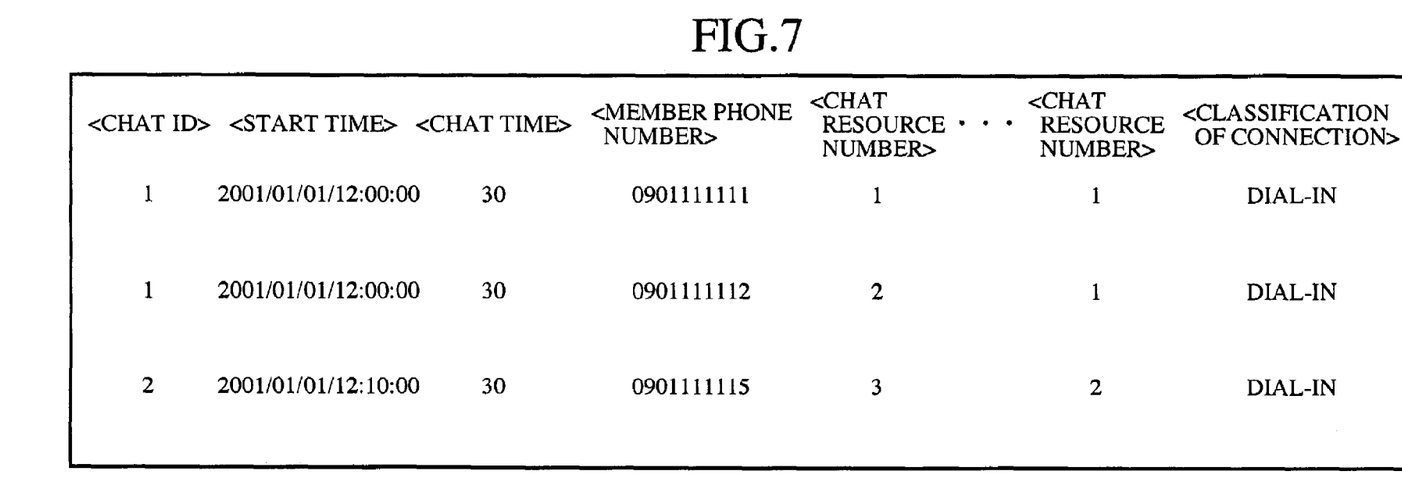
FIG. 7 is an explanatory diagram illustrating recorded contents stored in a schedule DB.

If the request details relate to the reservation for a chat or the change of chat, the schedule processing unit 21 refers to the acceptance processing definition file 19 and the schedule DB 20 (refers to FIGS. 6 and 7), and then checks availability of the resources of the video chat device 23 which is assigned to an acceptance processing unit corresponding to the acceptance ID, that is to say, the acceptance processing unit $15_1$ (step ST22).

If resources of the video chat device 23 (step ST23) are not available, the schedule processing unit 21 sends the result of the processing showing that resources are unavailable back to the acceptance IF processing unit 18 (step ST24).

On the other hand, if there is availability in the resources of the video chat device 23 (step ST23), and if the request details relate to the reservation for a chat (step ST25), the schedule processing unit 21 generates schedule information of the resource, and then writes the schedule information to the schedule DB 20 in order to reserve the use of the resource (step ST26). To be more specific, as the schedule information of the resource, the following are written to the schedule DB 20: a start time of chat utilization; a utilization time; a phone number of a line used at the time of chat utilization; the maximum number of chats; the maximum number of participants per chat; the maximum time of participation; a video image transfer rate; a type of image composition and so on (refers to FIG. 7).

In addition, the schedule processing unit 21 sends the result of the processing, in which the schedule information, etc. are recorded, back to the acceptance IF processing unit 18 (step ST27), and then notifies the execution processing unit 22 of the change of the schedule information (step ST28).

If the request details relate to the change of chat (step ST25), the schedule processing unit 21 changes the schedule information recorded in the schedule DB 20 before proceeding to processing of step ST27 (step ST29).

Moreover, if the request details relate to the cancellation of chat (step ST21), appropriate schedule information recorded in the schedule DB 20 is deleted (step ST30).

When receiving the result of the processing from the schedule-processing unit 21, the acceptance IF processing unit 18 sends the result of the processing back to the acceptance-processing unit $15_1$ (step ST13).

When receiving the result of the processing from the acceptance IF processing unit 18, the acceptance processing unit $15_1$ generates a screen showing the result of the processing, and then sends the screen back to the videophone 11 (step ST8).

In this manner, since the videophone 11 displays the screen showing the result of the processing, the user can know not only the completion of the reservation processing but also the utilization time, a designated phone number of a utilized line that connects to the video chat device 23, etc. Additionally, the user can also know, for example, that the reservation cannot be accepted.

Immediately after the startup, or when notification about the change of the schedule information is received from the schedule processing unit 21, the execution processing unit 22 reads the schedule information recorded in the schedule DB 20 (steps ST31, ST34) to determine as to whether or not there is a chat, the utilization of which will be started (step ST32).

If there is a chat to be started, the execution processing unit 22 instructs the video chat device 23 to start execution of a video chat when a start time of the chat comes (step ST33).

Thus, as a result of operation of the videophones 11, 12 by the users of the videophones 11, 12 to make a phone call to a designated phone number, the videophones 11, 12 are connected to the video chat device 23, and the video chat is thereby realized.

As can be clearly understood by the above description, according to the first embodiment, when one acceptance processing unit from among the acceptance processing units $15_1$ to $15_N$ performs acceptance processing of a reservation request, if there is availability in a resource of the video chat device 23 which is assigned to the acceptance processing unit, the use of the resource is reserved. Therefore, a user can perform the reservation operation directly. As a result, the utilization ratio of the video chat device 23 can be increased, which is an effect of the present invention.

It is to be noted that although the acceptance processing units $15_1$ to $15_N$ are placed in the acceptance-processing server 14 in the first embodiment, the acceptance processing units $15_1$ to $15_N$ may be placed in the chat control server 17. Moreover, although each of the members DBs $16_1$ to $16_N$ is provided in each of the acceptance processing units, one member DB may also be utilized by a plurality of acceptance processing units.

Second Embodiment

Although it is not particularly mentioned in the first embodiment, each of the acceptance processing units $15_1$ to $15_N$ may also have a GUI (Graphical User Interface) different from that of the other acceptance processing units.

This makes it possible to prepare the most appropriate acceptance interface in consideration of a type of a videophone, the classification of a member or the like when building the acceptance processing server 14.

Third Embodiment

Figure 8:
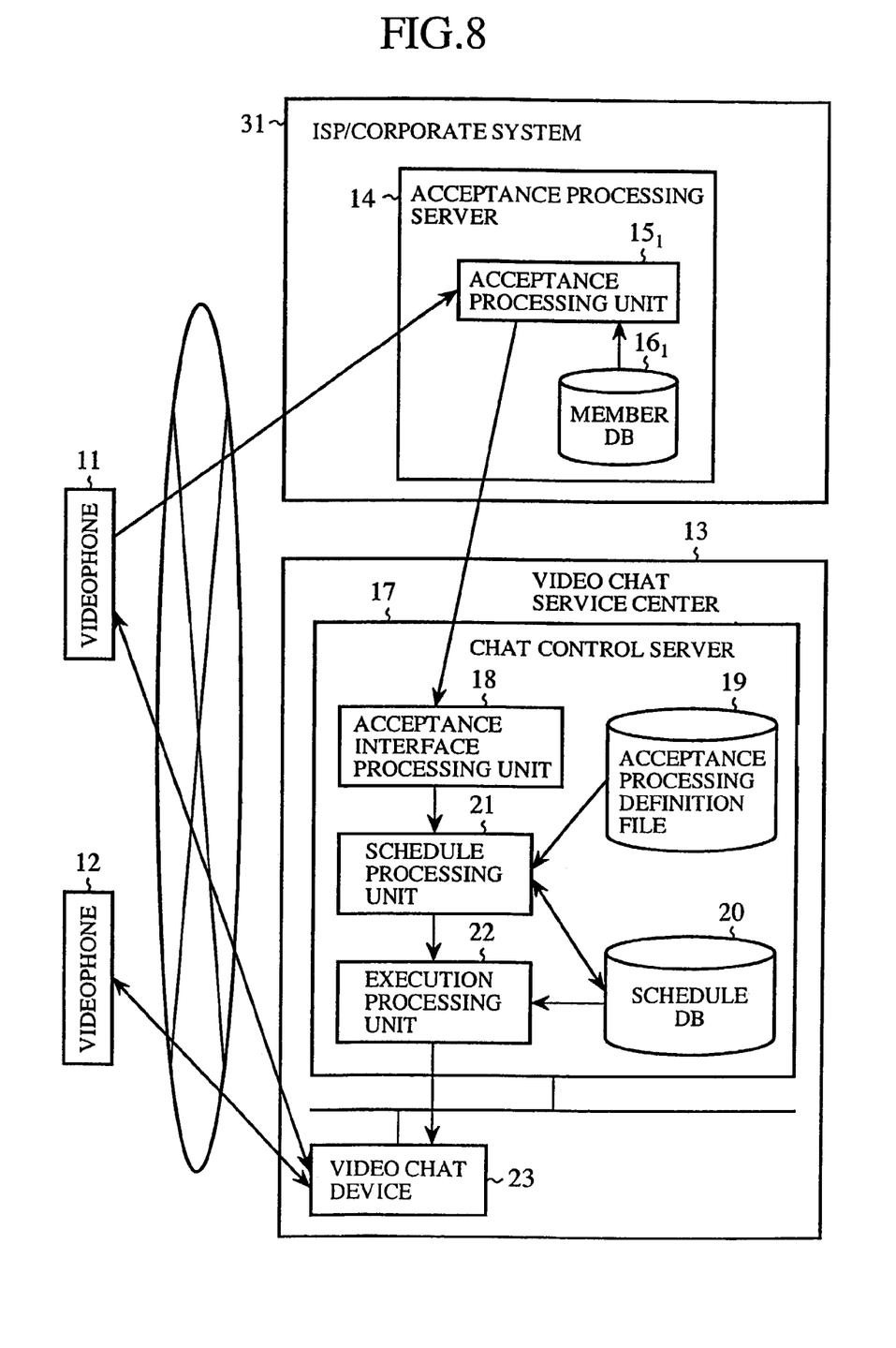
FIG. 8 is a configuration diagram illustrating a chat management system according to a third embodiment of the present invention.

In the first embodiment described above, the acceptance processing server 14 and the chat control server 17 are placed in the same video chat service center 13 (site). However, as shown in FIG. 8, the acceptance-processing server 14 may also be placed in a site different from a site where the chat control server 17 is placed. To be more specific, the acceptance-processing server 14 may also be placed in an ISP(Internet Service Provider)/corporate system (site) 31.

This permits video chat service to be provided via the ISP/corporate system 31 which is a system different from the video chat service center 13. As a result, the utilization ratio of the video chat device 23 can be increased, which is an effect of the present invention.

Figure 9:
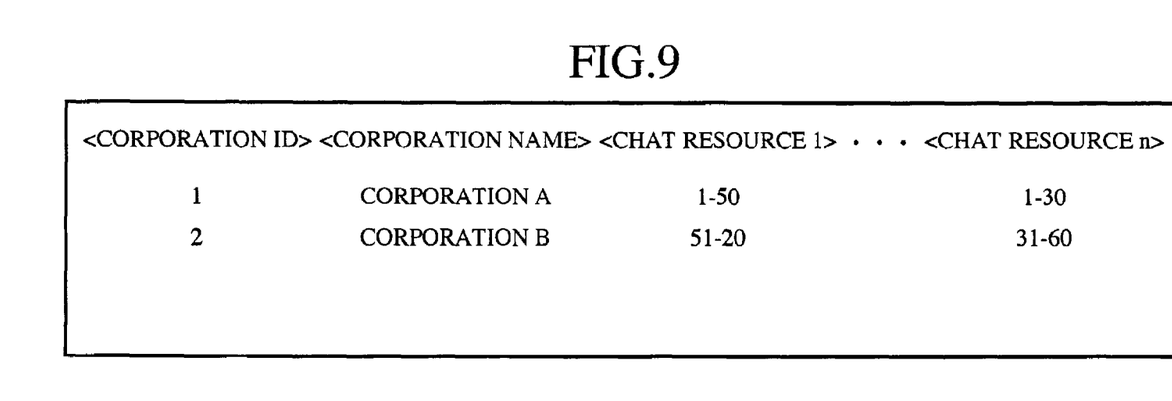
FIG. 9 is an explanatory diagram illustrating the details of definition of an acceptance processing definition file.

In this case, if the acceptance processing definition file 19 is defined as shown in FIG. 9, that is to say, if a resource of the video chat device 23 is assigned on a site (system) basis, and if there is availability in the resource of the video chat device 23 which is assigned to a site (for example, ISP/corporate system 31) having therein an acceptance processing unit that has performed acceptance processing of a reservation request, the schedule processing unit 21 reserves the use of the resource.

This enables the management of a resource of the video chat device 23 on a-site basis.

Fourth Embodiment

Figure 10:
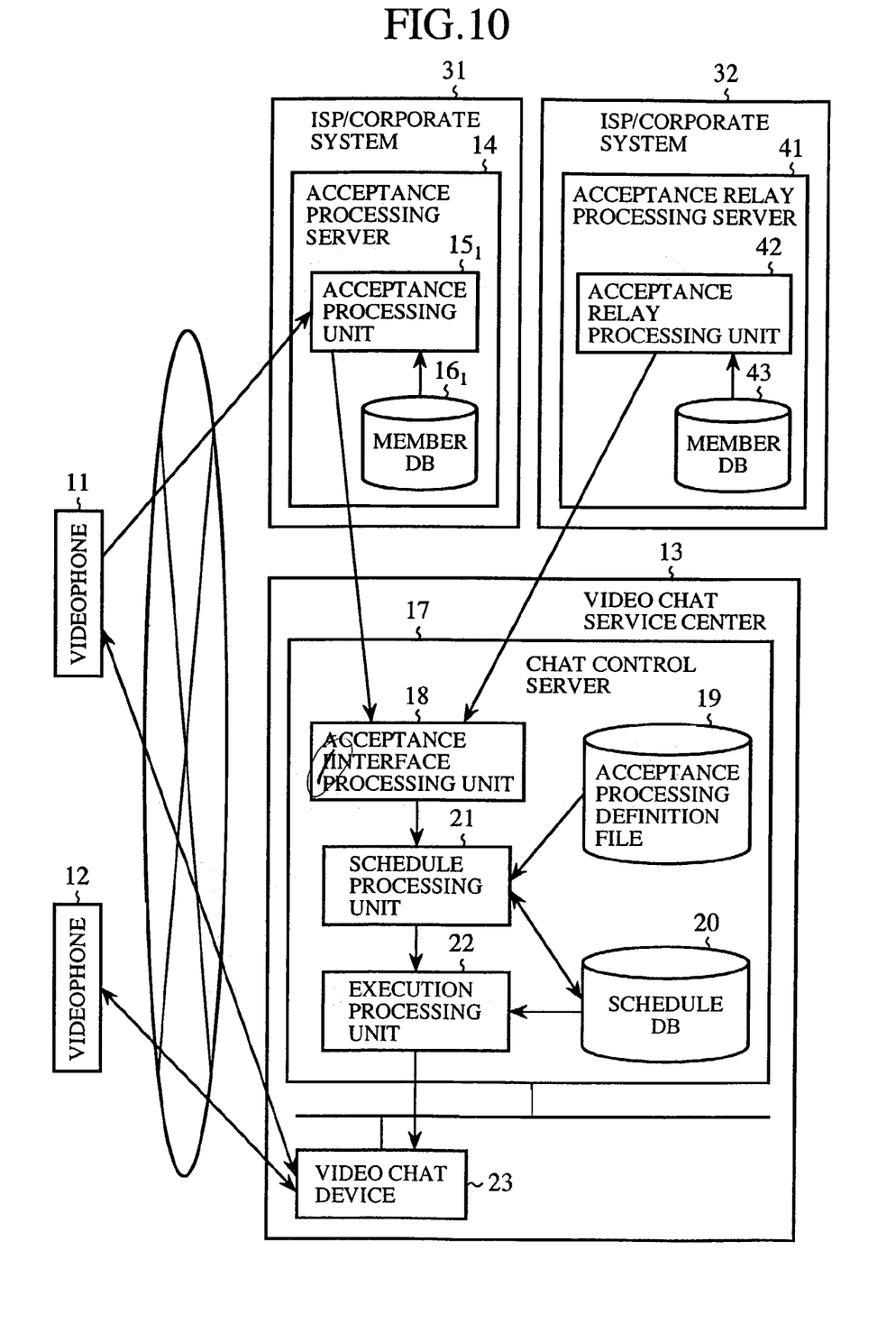
FIG. 10 is a configuration diagram illustrating a chat management system according to a fourth embodiment of the present invention.

In the third embodiment described above, when there is availability in a resource of the video chat device 23 which is assigned to a site (for example, ISP/corporate system 31) having therein an acceptance processing unit that has performed acceptance processing of a reservation request, the schedule processing unit 21 reserves the use of that resource. However, as shown in FIG. 10, an acceptance relay-processing server 41 (resource providing means) may also be provided. In this case, when the acceptance relay processing server 41 receives a resource providing request from the ISP/corporate system 31 having the acceptance processing unit $15_1$ that has performed acceptance processing of a reservation request, the acceptance relay processing server 41 provides the ISP/corporate system 31 with a resource of the video chat device 23 which is assigned to a site to which the acceptance relay processing server 41 belongs.

To be more specific, if the ISP/corporate system 31 lacks in a resource of the video chat device 23 which is assigned to its own site, or if the ISP/corporate system 31 needs to secure for other occasions a resource of the video chat device 23 which is assigned to its own site, the ISP/corporate system 31 cannot accept a reservation even if the ISP/corporate system 31 receives a reservation request for video chat from the videophone 11.

For this reason, in the fourth embodiment, in such a case, the acceptance-processing unit $15_1$ of the ISP/corporate system 31 outputs a resource-providing request to the ISP/corporate system 32.

When an acceptance relay processing unit 42 of the ISP/corporate system 32 receives the resource providing.

request from the ISP/corporate system 31, as is the case with the acceptance processing unit 15₁ of the ISP/corporate system 31, the acceptance relay processing unit 42 reserves use of the resource of the video chat device 23, which is assigned to the ISP/corporate system 32, by outputting the request details of the reservation and its acceptance ID to the acceptance IF processing unit 18.

As a result, even when a resource of the video chat device 23 which is assigned to the ISP/corporate system 31 is insufficient, video chat service can be provided. This produces an effect of enabling the efficient use of a resource of the video chat device 23 which is assigned to each site.

Fifth Embodiment

Figure 11:
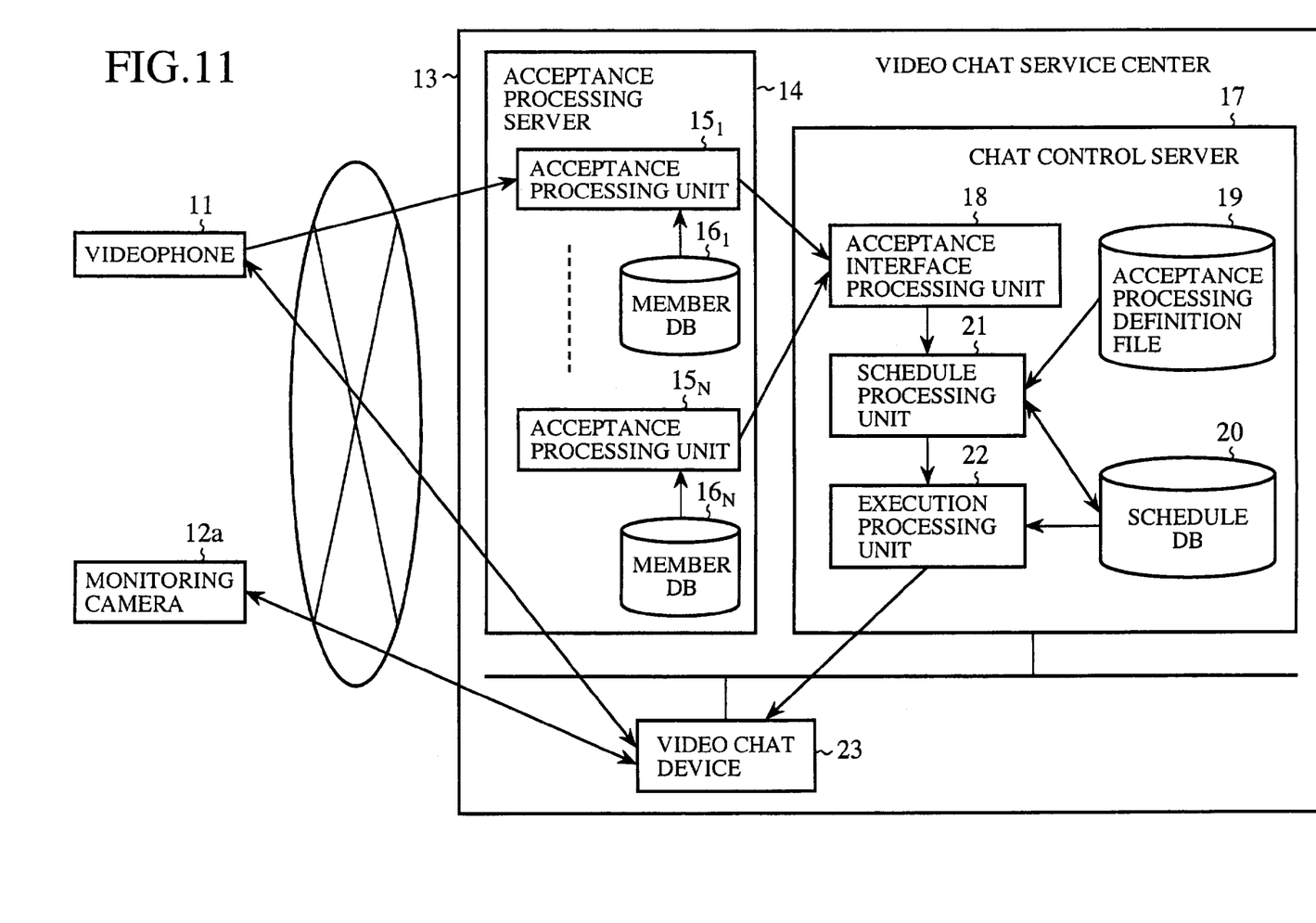
FIG. 11 is a configuration diagram illustrating a chat management system according to a fifth embodiment of the present invention.

In the first, second, third, and fourth embodiments described above, all of the user terminals for utilizing a video chat are videophones. However, as shown in FIG. 11, a part of the user terminals for utilizing a video chat may also be a monitoring camera 12a.

In this case, the video chat device 23 transmits the video image and voice of the monitoring camera 12a to the videophone 11 that is another user terminal.

To be more specific, if a phone number of the monitoring camera 12a and dial out (classification of connection) are designated as member information at the time of making a reservation for chat, when the video chat device 23 has an incoming call from the videophone 11, the video chat device 23 performs the dial out to the monitoring camera 12a. After the connection is made, the video chat device 23 transmits the video image and voice of the monitoring camera 12a to the videophone 11.

This makes it possible to build a monitoring system by which a user of the videophone 11 monitors the video image and voice of the monitoring camera 12a.

What is claimed is:

1. A chat management system comprising:
    a plurality of accepting means for, when receiving a reservation request for a video chat from a user terminal, acceptance processing of the reservation request;
    reservation means for, when one of the plurality of accepting means performs acceptance processing of the reservation request, if there is availability in resources of a video chat device assigned to the accepting means, making a reservation for use of the resources, wherein
        the plurality of accepting means are located at a site different from a site where the reservation means is located, and
        when resources of the video chat are assigned on a site basis and there is availability of resources of the video chat device assigned to a site having accepting means that has performed acceptance processing of a reservation request, the reservation means makes the reservation for use of the resources;
    resource providing means for, when a resource providing request is received from a site having therein an accepting means that has performed acceptance processing of a reservation request, providing a resource of the video chat device assigned to a site to which the resource providing means belongs, and, when the resources of the video chat device, which is assigned to the site to which the accepting means that has performed the acceptance processing of the reservation request belongs, are insufficient, the accepting means outputs a resource providing request to the resource providing means; and
    control means for controlling execution of the video chat device according to details of the reservation made by the reservation means.

2. The chat management system according to claim 1, wherein, when one of the accepting means accepts a request for a change or cancellation of a reservation, the reservation means changes the details of the reservation or the cancellation of the reservation in response to the request.

3. The chat management system according to claim 1, wherein each of the plurality of accepting means has a graphical user interface mutually different from that of the other accepting means.

4. The chat management system according to claim 1, wherein, if a part of user terminals for video chat is a monitoring camera, the video chat device transmits a video image of the monitoring camera to the other user terminals.

5. A chat management system comprising:
    a plurality of accepting means for, when receiving a reservation request for a video chat from a user terminal, acceptance processing of the reservation request;
    reservation means for, when one of the plurality of accepting means performs acceptance processing of the reservation request, if there is availability in resources of a video chat device assigned to the accepting means, making a reservation for use of the resources, wherein
        the plurality of accepting means are located at a site different from a site where the reservation means is located, and
        when resources of the video chat are assigned on a site basis and there is availability of resources of the video chat device assigned to a site having accepting means that has performed acceptance processing of a reservation request, the reservation means makes the reservation for use of the resources;
    resource providing means for, when a resource providing request is received from a site having therein an accepting means that has performed acceptance processing of a reservation request, providing a resource of the video chat device assigned to a site to which the resource providing means belongs, and, when the resources of the video chat device, which is assigned to the site to which the accepting means that has performed the acceptance processing of the reservation request belongs, is required to be secure for other occasions, the accepting means outputs a resource providing request to the resource providing means; and
    control means for controlling execution of the video chat device according to details of the reservation made by the reservation means.

6. The chat management system according to claim 5, wherein, when one of the accepting means accepts a request for a change or cancellation of a reservation, the reservation means changes the details of the reservation or the cancellation of the reservation in response to the request.

7. The chat management system according to claim 5, wherein each of the plurality of accepting means has a graphical user interface mutually different from that of the other accepting means.

8. The chat management system according to claim 5, wherein, if a part of user terminals for video chat is a monitoring camera, the video chat device transmits a video image of the monitoring camera to the other user terminals.

* * * * *

UNITED STATES PATENT AND TRADEMARK OFFICE
CERTIFICATE OF CORRECTION

PATENT NO. : 7,379,087 B2
APPLICATION NO. : 10/322421
DATED : May 27, 2008
INVENTOR(S) : Mitsuyoshi Yamatari et al.

It is certified that error appears in the above-identified patent and that said Letters Patent is hereby corrected as shown below:

(73) Assignee: Change [NTT Docomo] to --NTT DoCoMo, Inc.--

Signed and Sealed this
Twentieth Day of September, 2011

David J. Kappos
*Director of the United States Patent and Trademark Office*